United States Patent [19]

Stead et al.

[11] 4,297,408

[45] Oct. 27, 1981

[54] LAMINATES OF CLOTH AND FILLED CRYSTALLINE POLYPROPYLENE AND A METHOD FOR MAKING THEM

[75] Inventors: John C. Stead, Knebworth; Peter E. Waghorn, Welwyn Garden City, both of England

[73] Assignee: Imperial Chemical Industries Limited, London, England

[21] Appl. No.: 104,058

[22] Filed: Dec. 17, 1979

[30] Foreign Application Priority Data

Dec. 29, 1978 [GB] United Kingdom ............... 50242/78

[51] Int. Cl.$^3$ ...................... B32B 27/12; B32B 27/20; B32B 27/32; B32B 31/08
[52] U.S. Cl. .................................... 428/240; 428/96; 428/204; 428/241; 428/243; 428/248; 428/252; 428/282; 428/283; 428/286; 428/310; 428/315; 428/461; 428/516; 428/904; 156/228; 156/324; 156/334
[58] Field of Search ............... 428/240, 241, 243, 252, 428/282, 283, 286, 516, 461; 156/228, 334

[56] References Cited

U.S. PATENT DOCUMENTS

| 3,437,550 | 4/1969 | Paul ..................................... 428/429 |
| 3,607,616 | 9/1971 | Barbehenn .......................... 428/286 |
| 3,862,869 | 1/1975 | Peterson et al. .................... 156/334 |
| 3,887,745 | 6/1975 | Yoshii et al. ........................ 428/516 |
| 4,046,945 | 9/1977 | Baxmann et al. ................... 156/334 |
| 4,148,972 | 4/1979 | Yamane ............................... 428/516 |
| 4,211,811 | 7/1980 | Bordini et al. ...................... 428/516 |

FOREIGN PATENT DOCUMENTS

| 2605753 | 2/1976 | Fed. Rep. of Germany . |
| 2731437 | 7/1977 | Fed. Rep. of Germany ...... 156/334 |
| 1014893 | 12/1965 | United Kingdom ............... 156/334 |
| 1412847 | 11/1975 | United Kingdom . |
| 1445939 | 8/1976 | United Kingdom . |
| 1456753 | 11/1976 | United Kingdom . |

*Primary Examiner*—James C. Cannon
*Attorney, Agent, or Firm*—Cushman, Darby & Cushman

[57] ABSTRACT

Laminates comprising cloth (17) or other sheet material bonded to a filled crystalline polypropylene composition (14) by means of an unfilled crystalline polypropylene composition (15), preferably a crystalline random copolymer of propylene and 0.5 to 5.0% of ethylene. The laminates are made by sandwiching preferably a sheet (15) of the unfilled composition between the cloth (17) and filled composition (14) and then heating the sandwich to above the crystalline melting points of the polypropylenes and subsequently cooling to form the laminate. The fillers may be minerals or wood flour, the cloths may be knitted, woven or felted and other sheet materials may be plastics films, metal foils, paper or leather cloth.

5 Claims, 3 Drawing Figures

LAMINATES OF CLOTH AND FILLED CRYSTALLINE POLYPROPYLENE AND A METHOD FOR MAKING THEM

This invention relates to laminates of cloth or other sheet material and filled crystalline polypropylenes and to a method of making them.

Crystalline polypropylenes often contain fillers to increase their stiffness and to reduce their shrinkage during crystallisation and sometimes to reduce costs. Unfortunately, fillers can reduce the adhesion of polypropylene compositions to cloth or other sheet material and in particular cloth easily delaminates from a filled composition in concave regions of a shaped article made by thermoforming (for example, pressure forming including warm forging) a sheet of cloth/filled polypropylene laminate.

German Offenlegungsschrift No. 2 727 285 discloses the lamination of cloth to filled polypropylenes and it improves adhesion between the cloth and filled polypropylene by using auxiliary heating and mineral fillers of high specific heat so as to ensure that the composition remains very hot while it contacts the cloth. The process is less effective with fillers of high specific volume (e.g. wood flour despite its high specific heat). Also the use of very hot compositions promotes oxidative degradation of the polypropylene and certain fillers, especially wood flour and further limits the range of heat-sensitive cloths which may be used.

Cloths or other sheet materials have been bonded adhesively to polypropylene, but commercial adhesives are usually incompatible with crystalline polypropylene and so their use creates a significant line of weakness in the laminate. The problem is aggravated by differential contraction when the laminate cools.

It has now been discovered that adhesion can be improved by interposing unfilled crystalline polypropylene between the cloth or other sheet material and the filled crystalline polypropylene. Especially good improvements are obtained using random copolymers of propylene with amounts of ethylene which are small enough to allow the copolymer to crystallise. For example, improved adhesion is obtained even when the filler is wood flour. The crystallinity of polypropylene is measured by X-rays by the method of Natta et al described in "Rendiconti dell' Academia dei Lincei" January 1957 pages 11 to 17 and for the purposes of this specification propylene homopolymers or sequential copolymers are only considered to be "crystalline" if they are at least 40 (preferably 50)% crystalline as measured by the method of Natta et al.

Accordingly, this invention provides a laminate of cloth or other sheet material and a filled crystalline polypropylene composition containing 20 to 80 (preferably 30 to 70)% by weight of a particulate filler characterised in that between the cloth or other sheet material and the filled composition is an unfilled crystalline polypropylene composition. The percentage of filler is based on the total weight of the composition. The laminate may be in the form of a shaped article having concave curvatures of over 0.5 (for example 1 to 3) cm$^{-1}$ optionally made by thermoforming from sheet.

The crystalline polypropylene may be a homopolymer, sequential copolymer with up to 25 (preferably 7 to 18)% of other $\alpha$-olefin or a random copolymer with up to 10 (preferably 0.5 to 5)% of other $\alpha$-olefin. The percentage of comonomer is by weight based on the weight of the copolymer. The preferred comonomer is ethylene. The polypropylene preferably has a melt flow index of from 0.1 to 40 (more preferably 0.5 to 10) g/10 minutes when measured prior to mixing with the filler. Melt flow index is measured according to British Standard 2782: Part 1: Method 105C of 1970 using a 2.16 kg load and performed at 230° C. The polypropylene (usually the homopolymer) may be blended with up to 40% by weight (based on the weight of the polypropylene) of a rubbery material which improves the impact resistance of the polypropylene. Typical rubbery materials include butyl rubbers, polyisobutylenes and amorphous rubbery copolymers of ethylene and propylene (especially when diene modified) as described in "Chemistry and Industry" March 16, 1974 pages 255 to 258. Typical sequential copolymers are made by adding 7 to 25% by weight of ethylene to the closing stages of an otherwise propylene homopolymerisation when at least some of the ethylene/propylene chains may form as blocks on an otherwise homopolymer chain.

Random copolymers are made by polymerising propylene and for at least a major proportion of the polymerisation the propylene is mixed with the required amount of other $\alpha$-olefin. Random copolymers of propylene and ethylene and containing some $\gamma$-crystallinity of the type described in "Makromolekulare Chemie" Volume 75 of 1964 pages 134 to 158 are preferred. Such crystalline random copolymers have good compatibility with crystalline homopolymers or sequential copolymers of propylene especially if the random copolymers are at least 40% crystalline by the method of Natta et al.

Both the filled and unfilled polypropylene compositions may contain up to 7% by weight of the polypropylene of non-filler additives such as stabilisers (e.g. antioxidants or light stabilisers), soaps and lubricants (e.g. metal stearates) and pigments (e.g. titania or carbon black).

The particulate fillers should preferably pass through ASTM Sieve 40 (420$\mu$) and desirably mineral fillers should have a particle size of from 1 to 25$\mu$. The compositions preferably contain 45 to 70% of mineral filler or 30 to 50% of organic (including fibrous) filler. Typical mineral fillers include chalk, limestone, dolomite, gypsum, barytes, talc, slate flour, clay, mica or pulverised fuel ash, all of which may be treated with coupling agents. However, fibrous organic fillers such as wood flour are preferred because of their lower density and lower abrasiveness. Wood flour usefully has a particle size of 100 to 350$\mu$.

The cloth may, for example, comprise knitted, woven or felted fibres of cotton, wool, glass, polypropylene, nylon, polyethylene terephthalate, polyacrylate or mixtures of two or more such fibres. A very suitable cloth comprises a needle-tufted non-woven mat of different fibres (preferably polyester and nylon). A suitable polyester is polyethylene terephthalate optionally containing up to 10% by weight of the polyester of copolymerised isophthalic acid. Melded cloth sold as 'Cambrelle' (i.e. cloth comprising fusion-bonded conjugate fibres as described, for example, in British patent specification No. 1 078 181) is also suitable. The surface of the cloth which is not destined to be bonded to the polypropylene may be bonded to a layer of other material. For example, it may be coated with a moderately heat-sensitive optionally foamed thermoplastics material such as plasticised polyvinyl chloride to provide a leather-like decorative finish on the laminate. Alternatively, a foamed interlayer may be inserted between the cloth and a layer of plasticised polyvinyl chloride. Other sheet materials include plastics films (especially optionally metallised films of polyethylene terephthalate or the like), metal foils or paper (especially when printed to simulate the appearance of wood).

The laminate can be made by:
(a) heating the filled and unfilled polypropylene compositions to temperatures above the crystalline melting points of their polypropylenes,
(b) contacting a surface of the filled composition with a surface of the unfilled composition before, during or after heating,
(c) contacting the cloth or other sheet material with another surface of the unfilled composition under conditions of temperature and pressure such that some unfilled composition flows into the cloth or into intimate contact with the other sheet material and then
(d) cooling the filled and unfilled compositions to below their crystalline melting points whereupon the unfilled composition bonds the cloth or other sheet material to the filled composition to form the laminate.

Preferably at least some of the heat used to heat the unfilled composition is supplied by the heated filled composition when the two compositions are in contact.

Specific procedures for making the laminates will now be described with reference to the drawings of which:

Figure 1:
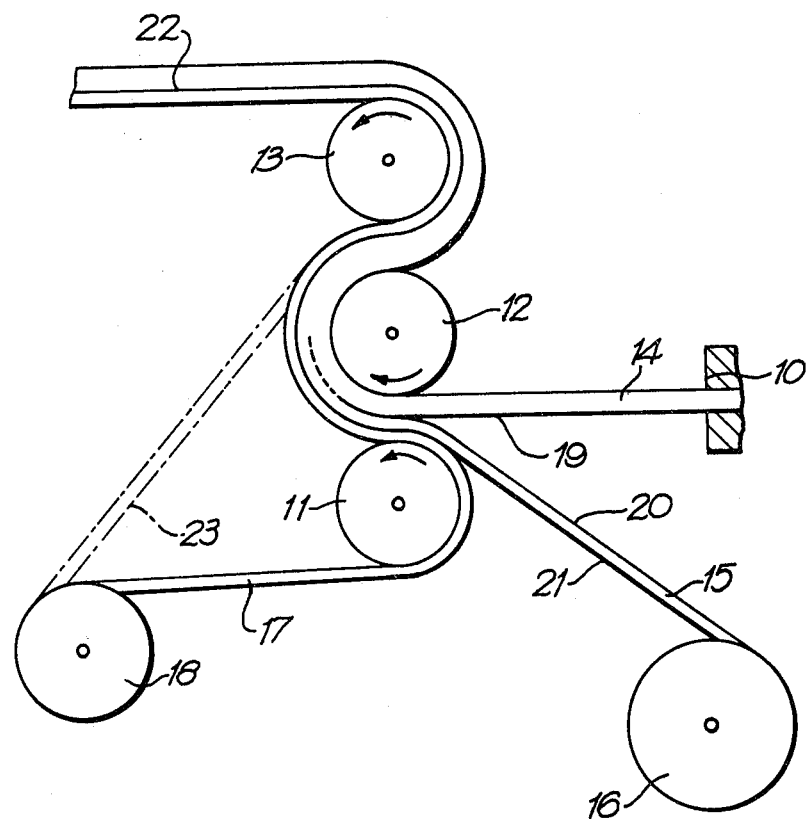
FIG. 1 is an elevation of a three roll stack and components of a laminate.

FIG. 1 illustrates a procedure for making a flat laminate using a stack of three rolls 11, 12 and 13. A sheet 14 of filled polypropylene composition is extruded from a die 10 and fed to the nip between rolls 11 and 12 while the sheet 14 remains at a temperature above the crystalline melting point of the polypropylene. A web 15 of unfilled polypropylene is unwound from reel 16 and cloth 17 is unwound from reel 18. Web 15 and cloth 17 are also fed to the nip between opposed rollers 11 and 12 such that web 15 is sandwiched between sheet 14 and cloth 17. The temperature of roll 12 is adjusted to retard cooling of sheet 14 so that heat from sheet 14 raises the temperature of web 15 above the crystalline melting point of the polypropylene in the unfilled composition so that on or short after being nipped between opposed rollers 11 and 12, region 20 fuses with the upper surface region 19 of sheet 14 and the boundary between them becomes insignificant. Heat from sheet 14 also softens the upper surface region 21 of web 15 so that when nipped between opposed rollers 11 and 12, unfilled composition flows into some of the interstices (not shown) of cloth 17. On cooling the laminate 22 is formed.

The dashed lines 23 shown in FIG. 1 indicate a modified procedure in which cloth 17 is fed to the nip between opposed rollers 12 and 13. This modification can be of benefit when using heat-sensitive cloths.

Die 10 may be replaced by any convenient source of hot extruded sheet, for example, a calender.

By omitting cloth 17, the procedure described with reference to FIG. 1 may be used to make a composite of filled and unfilled compositions to which cloth can be laminated in some subsequent operation such as a pressing operation as hereinafter described with reference to FIG. 2. Although this involves a second step in the making of the laminate, it does allow greater flexibility in choice of cloth and the possibility of recycling offcutts left when particular shapes of composite are cut from the sheet produced by rolls 11, 12 and 13. Accordingly, this invention also provides a composite comprising a layer of filled crystalline polypropylene composition bonded to a layer of unfilled crystalline polypropylene composition.

The sheet of filled polypropylene composition conveniently has a thickness of from 0.5 to 5 mm and preferably of 1 to 3 mm. The web of unfilled polypropylene composition preferably has a thickness of 25 to 75$\mu$. Webs of a copolymer comprising 1.5 to 4% of randomly copolymerised ethylene and having a thickness of 25 to 75$\mu$ are preferred because their use together with a careful adjustment of the temperatures of the extruded sheet 14 and of roll 12 greatly facilitates the lamination of heat-sensitive cloths such as polypropylene cloths in general or cotton cloths coated with (optionally foamed) plasticised polyvinyl chloride. Lamination of heat-sensitive cloths using unfilled compositions comprising homopolymers or sequential copolymers is more difficult.

Instead of using a web, the unfilled composition may optionally be pre-coated onto the cloth. Such coated cloths can also be thermoformed into preforms having complex shapes so giving rise to a possible modification of this invention in which molten plastics composition (filled or unfilled) is injection moulded onto unfilled composition of the preform. The modification facilitates production of articles of complex shape and reduces the risk of total penetration of the cloth by plastics material during an injection moulding process. The unfilled coating creates a stiff preform which is more easily positioned in an injection mould. An injection moulded unfilled plastics material is preferably the same as the unfilled composition of the coating on the preform except that the coating material preferably has a lower melt flow index. If a filled composition is injection moulded on the preform, then preferably the coating comprises a random copolymer.

Figure 2:
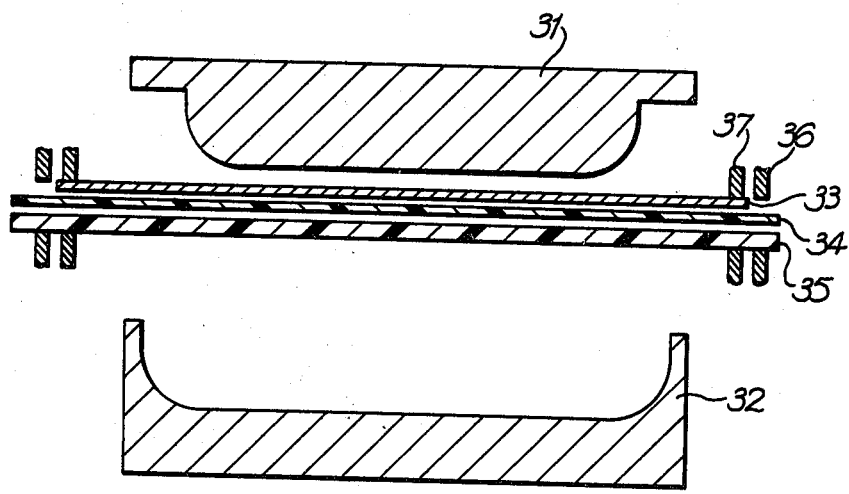
FIG. 2 is a section of a thermoforming press containing components of a laminate.

FIG. 2 illustrates an alternative procedure for making a laminate using a thermoforming tool having a plug 31 and cavity 32 parts of a thermoforming tool. Inserted between plug 31 and cavity 32 is a sandwich consisting of cloth 33, sheet of unfilled polypropylene composition 34 and sheet of filled polypropylene composition 35. The sandwich lies between jaws 36 and 37 of a fixed clamp (not shown).

Figure 3:
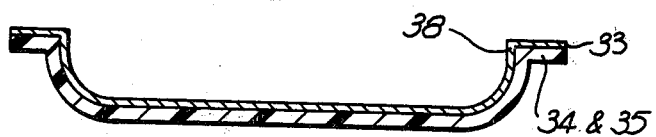
FIG. 3 is a section of a laminate made in the press shown in FIG. 2.

To make the shaped laminate shown in FIG. 3, sheets 34 and 35 of unfilled and filled polypropylene compositions respectively are inserted between plug 31 and cavity 32 and between jaws 36 and 37. Jaws 36 are closed to hold sheets 34 and 35. Infra-red heaters (not shown) are moved into positions above and below the pair of sheets 34 and 35 and used to heat sheets 34 and 35 to a temperature in the vicinity of the crystalline melting points of the polypropylenes of the sheets. The heaters are withdrawn and cloth 33 is laid on sheet 34 with its edges between jaws 37 which are then closed to grip the sandwich. Plug 31 and cavity 32 are brought together so that plug 31 enters cavity 32 causing the sandwich to conform to the shape of plug 31 and cavity 32. Pressure exerted by plug 31 and cavity 32 forces softened unfilled composition from sheet 34 into interstices (not shown) in cloth 33 and also promotes intimate contact between the unfilled and filled compositions of sheets 34 and 35. On cooling, the boundary between sheets 34 and 35 becomes insignificant and as the polypropylene compositions solidify, cloth 33 becomes bonded to sheet 35 by means of the unfilled composition of sheet 34 to produce the laminate shown in FIG. 3. In particular, cloth 33 is bonded to sheet 35 even in radiussed portions 38 which have a curvature of 1 cm$^{-1}$.

If cloth 33 is not heat-sensitive, it can be laid on sheet 34 before heating so avoiding the need for jaws 36. Sheets 34 and 35 may be replaced by a composite sheet comprising a layer of filled composition bonded to a layer of unfilled composition made for example by the procedure described with reference to FIG. 1 but modified by the omission of cloth 17.

The procedures described with reference to FIG. 2 may be modified by heating sheet 35 (or a corresponding composite) solely or mainly by heaters positioned below sheet 35. Although this is a slower operation, it does permit greater tolerance of heat-sensitive cloths, especially if the unfilled composition comprises the most preferred random copolymers in thicknesses of 25 to 75$\mu$.

Flat laminates suitable for thermoforming can be made by replacing plug 31 and cavity 32 by a pair of opposed flat plattens. Flat laminates made by the procedure described with reference to FIG. 1 can be coverted into shaped laminates using the plug and cavity method described with reference to FIG. 2.

The invention is further illustrated by the following examples of which 1b, 2b and 5b are comparative.

EXAMPLES 1 TO 6

Laminates were made by the procedure described with reference to FIG. 1 of the drawings in which various cloths (as specified in Table 1) were nipped between the bottom two rolls of a three roll stack. The top roll was maintained at 95° C., the middle roll at 100° C. and the bottom roll at 105° C.

A composition comprising by weight:
40% wood flour and
60% of a suitably stabilised polypropylene of melt flow index 1.5 g/10 minutes which was a sequential copolymer of propylene and 15% ethylene.
was extruded into sheet 2 mm thick at a temperature of 195° to 205° C. and transferred a distance of 0.1 m at room temperature to the bottom nip of the three roll stack. A web 50$\mu$ thick of an unfilled random copolymer of $\gamma$-crystalline propylene and 2% ethylene of melt flow index 4.0 g/10 minutes was pressed onto the extruded sheet by the bottom nip which also pressed the cloth onto web of random copolymer. The sheets and cloth had a residence time of 20 seconds on the stack and on leaving the stack they cooled to room temperature forming a laminate which could be thermoformed in a press of the type illustrated in FIG. 2 without delamination of the cloth in the radiussed portions.

TABLE 1

| Example | Propylene polymer | Cloth | Delamination |
| --- | --- | --- | --- |
| 1a | Random copolymer | Knitted cotton | Slight on sharp radii |
| 1b | None | Knitted cotton | Yes |
| 2a | Random copolymer | Polyester/polyamide knitted cloth | No |
| 2b | None | Polyester/polyamide knitted cloth | Yes |
| 3 | Random copolymer | Melded cloth based on nylon 6/nylon 66 conjugate fibres | No |
| 4 | Random copolymer | Felted polypropylene fibres | No |
| 5a | Random copolymer | Textile cloth coated with plasticised polyvinyl chloride | No |
| 5b | None | Textile cloth coated with plasticised polyvinyl chloride | Yes |
| 6 | Random copolymer | Needle-tufted non-woven mat of a mixture of fibres of nylon 6 with fibres of polyethylene terephthalate. | No |

EXAMPLE 7

A laminate was made by the procedure of Example 1a except that the filled polypropylene composition contained 40% by weight chalk having a particle size of from 1 to 25$\mu$ instead of the wood flour and the knitted cotton cloth was coated with plasticised polyvinyl chloride on the surface not to be laminated to the polypropylene. A laminate was obtained in which the cloth was firmly bonded to the remainder of the laminate.

The procedure was repeated except that the web of random copolymer was omitted. A laminate was obtained in which the cloth was easily peeled from the filled polypropylene composition.

We claim:
1. A laminate comprising cloth or other sheet material and a layer of a filled crystalline polypropylene composition containing 20 to 80% by weight of a particulate filler wherein the cloth or other sheet material is adhered to a surface of the layer of filled polypropylene composition by means of a layer of unfilled random copolymer of propylene with up to 10% (by weight of the copolymer) of ethylene interposed between the cloth or other sheet material and said surface.

2. A laminate according to claim 1 wherein the random copolymer contains some $\gamma$-crystallinity.

3. A method for making a laminate as claimed in claim 1 wherein the method comprises:
   (a) heating the filled and unfilled polypropylene compositions to temperatures above the crystalline melting points of their polypropylenes,
   (b) contacting a surface of the filled composition with a surface of the unfilled composition before, during or after heating,
   (c) contacting the cloth or other sheet material with another surface of the unfilled composition under conditions of temperature and pressure such that some unfilled composition flows into the cloth or into intimate contact with the other sheet material and then
   (d) cooling the filled and unfilled compositions to below their crystalline melting points whereupon the unfilled composition bonds the cloth or other sheet material to the filled composition to form the laminate.

4. A process according to claim 3 wherein the filled composition, the unfilled composition and the cloth or other sheet material are brought into intimate contact by nipping between opposed rollers.

5. A process according to claim 3 wherein the unfilled composition is provided as a web sandwiched between a sheet of filled composition and cloth or other sheet material, the sandwich is located between opposed plus and cavity components of a thermoforming tool and the opposed surfaces of the components of the sandwich are brought into intimate contact by advancing the plug into the cavity.

* * * * *